(12) United States Patent
Cable et al.

(10) Patent No.: US 7,246,741 B2
(45) Date of Patent: Jul. 24, 2007

(54) METHOD AND SYSTEM FOR PROCESSING A FINANCIAL TRANSACTION

(75) Inventors: Thomas Lee Cable, Duluth, GA (US); William Malcolm Ross, Jacksonville, FL (US)

(73) Assignee: NetBank, Alpharetta, GA (US)

( * ) Notice: Subject to any disclaimer, the term of this patent is extended or adjusted under 35 U.S.C. 154(b) by 290 days.

(21) Appl. No.: 11/085,694

(22) Filed: Mar. 21, 2005

(65) Prior Publication Data

US 2006/0208059 A1   Sep. 21, 2006

(51) Int. Cl.
  G06Q 40/00  (2006.01)
  G07D 11/00  (2006.01)
  G07F 19/00  (2006.01)

(52) U.S. Cl. .................................. 235/379; 705/45
(58) Field of Classification Search .............. 235/379; 705/42, 43, 45; 902/8, 9
See application file for complete search history.

(56) References Cited

U.S. PATENT DOCUMENTS

| | | | | |
|---|---|---|---|---|
| 4,134,537 A | * | 1/1979 | Glaser et al. | ............... 235/379 |
| 4,447,714 A | * | 5/1984 | Lundblad | .................... 235/379 |
| 5,198,975 A | | 3/1993 | Baker et al. | |
| 5,310,062 A | | 5/1994 | Stevens et al. | |
| 5,465,206 A | | 11/1995 | Hilt et al. | |
| 5,583,759 A | * | 12/1996 | Geer | ............................ 705/45 |
| 5,832,460 A | | 11/1998 | Bednar et al. | |
| 5,848,400 A | | 12/1998 | Chang | |
| 5,930,778 A | * | 7/1999 | Geer | ............................ 705/45 |
| 5,978,780 A | | 11/1999 | Watson | |
| 6,246,925 B1 | | 6/2001 | Robinson et al. | |
| 6,301,379 B1 | | 10/2001 | Thompson et al. | |
| 6,317,745 B1 | | 11/2001 | Thomas et al. | |
| 6,574,377 B1 | | 6/2003 | Cahill et al. | |
| 6,847,935 B1 | | 1/2005 | Solomon et al. | |
| 7,021,528 B2 | | 4/2006 | Igval et al. | ................. 235/379 |
| 2002/0032651 A1 | | 3/2002 | Embrey | |
| 2002/0095306 A1 | | 7/2002 | Smith | |
| 2002/0120570 A1 | | 8/2002 | Loy | |
| 2002/0161704 A1 | | 10/2002 | Powar | |
| 2002/0184127 A1 | | 12/2002 | Callioni et al. | |
| 2003/0046224 A1 | | 3/2003 | Mujtaba et al. | |
| 2004/0148252 A1 | | 7/2004 | Fleishman | |
| 2004/0181485 A1 | | 9/2004 | Finch et al. | |
| 2005/0015341 A1 | | 1/2005 | Jackson | |
| 2005/0038748 A1 | | 2/2005 | Latimer et al. | |
| 2005/0121517 A1 | | 6/2005 | Igval et al. | |

* cited by examiner

*Primary Examiner*—Uyen-Chau N. Le
(74) *Attorney, Agent, or Firm*—King & Spalding LLP

(57) ABSTRACT

Convenient, efficient, and cost-effective processing of a financial transaction. Banking customers can drop-off financial transaction requests at any of a plurality of geographically dispersed collection sites that operate on behalf of an expedited mail delivery service. Each collection site can aggregate received transaction requests into a package to be delivered to a transaction processing center via expedited mail delivery. Each transaction request can be contained within an envelope. Utilizing unique identifying insignias on each envelope and package, the location of each envelope and package can be tracked during the expedited mail delivery. Upon receipt, the transaction processing center can process each transaction request.

19 Claims, 5 Drawing Sheets

SYSTEM OVERVIEW

SYSTEM OVERVIEW

METHOD AND SYSTEM FOR PROCESSING A FINANCIAL TRANSACTION

TECHNICAL FIELD

The present invention relates generally to the processing of a financial transaction, and, more specifically, to the processing of financial transactions by collecting customers' financial transaction requests at expedited mail delivery service provider collection sites and delivering the collected requests via mail for processing by a transaction processing center.

BACKGROUND OF THE INVENTION

Not long after the development of the World Wide Web came the development of Internet banking. By offering products and services via the Internet rather than through expensive "brick and mortar" bank branches, "online banks" could successfully offer industry-leading deposit rates and low or no fees to their customers. Unfortunately for these online banks and their customers, however, there are still many basic banking transactions, which to date require banking customers to go to a branch office. Among these transactions are depositing, and making loan payments with, paper checks. Even more unfortunate is the fact that many banks, including some that are not "online," offer only a few (or no) branch offices. Customers of such banks are forced to either travel inordinate distances or work with other, less preferred, banks to complete their desired banking transactions.

Traditionally, banks have attempted to overcome the need for more convenient transaction processing by bearing the enormous expense of opening new branch offices in a variety of geographical locations. However, the expense of such an approach is generally prohibitive, especially to online and smaller-sized banks.

More recently, banks have made it possible for customers to have their transaction requests processed without requiring the customer to physically travel to a branch office. Under this approach, customers can mail their transaction requests via conventional U.S. mail delivery to a remote branch (or, if there are no branches, to another processing) location for processing. Each customer separately mails his or her transaction request to the bank. Typically, the cost for such mailing is paid by the bank. After several days in transit, the transaction request is received by the bank branch for processing. The bank expends its own resources to process each transaction request as it is received. Unfortunately, despite the great costs to the bank, and regardless of how well each transaction is processed, banking customers inevitably are disappointed and frustrated with this approach. Banking customers desire convenient and efficient transaction processing. Those desires are unmet due to the significant processing delays inherent in this approach.

Therefore, there is a present need for a more convenient and efficient approach to financial transaction processing. In addition, there is a need for such processing to be cost-effective. The present invention solves these needs.

SUMMARY OF THE INVENTION

The present invention overcomes the foregoing limitations of the prior art by providing a convenient, efficient, and cost-effective system and method for processing a financial transaction. Specifically, the present invention allows customers to drop-off financial transaction requests with existing mail delivery service provider collection sites that can expeditiously deliver the transaction requests to a transaction processing center for processing. By utilizing existing collection sites and one or more transaction processing centers, banks with few or no branch offices can instantaneously expand their markets, and provide their existing customers with added convenience and more efficient transaction processing, at a nominal cost.

In one aspect, the present invention provides a method and system for processing a financial transaction. Customers can drop-off a transaction request to any of a plurality of collection sites operated on behalf of an expedited mail delivery service provider. The collection sites can constitute a network of geographically dispersed service centers operating on behalf of the expedited mail delivery service provider. The transaction request can comprise a financial instrument, such as a check, money order, or other instrument used to transfer funds, and information about a requested transaction, including for example a deposit slip or payment slip. The requested transaction can be, for example, either a credit to a customer's bank account or a debit from the customer's bank account.

Each collection site can prepare a package comprising each transaction request that it collected during a predetermined time period. For example, at the end of a business day, the collection site might gather each of the transaction requests that it collected during the business day. In turn, the collection site can mail its package comprising the collected transaction requests to a transaction processing center via expedited mail delivery. Upon receiving each package, the transaction processing center can support the completion of each transaction request by processing the transaction request for settlement by either a clearinghouse or the requesting customer's bank.

Transaction request processing can be done via electronic or other, non-electronic means. For example, the transaction processing center can process a transaction request comprising a paper check by creating and sending an electronic image of the check to a clearinghouse or the requesting customer's bank. In the alternative, the center can create and send a substitute check (an operational copy of the original paper check) to a clearinghouse or the requesting customer's bank or send the original paper check to a clearinghouse or the requesting customer's bank.

In another aspect, the present invention provides a method and system for tracking the location of a transaction request during the expedited mail delivery of its associated package from a collection site to the transaction processing center. Each transaction request can be contained within an envelope that comprises a unique identifying insignia such as a barcode and/or an identification number. In addition, each package can comprise a second unique identifying insignia. By associating the insignia of a package with the insignia of each of the envelopes contained within the package, each envelope's location can be tracked simply by using the package's unique insignia to track the package. For example, a customer that has submitted an envelope with a unique insignia can inquire about the envelope's location. By linking the envelope's insignia with the package's insignia, a tracking engine can use the package's insignia, for example with existing tracking technology, to determine the envelope's location. In an additional aspect of the present invention, a customer can create his or her own envelope to be dropped off at a collection site.

The discussion of processing a financial transaction presented in this summary is for illustrative purposes only. Various aspects of the present invention can be more clearly understood and appreciated from a review of the following detailed description of the disclosed embodiments and by reference to the drawings and claims.

DETAILED DESCRIPTION OF EXEMPLARY EMBODIMENTS

Figure 1:
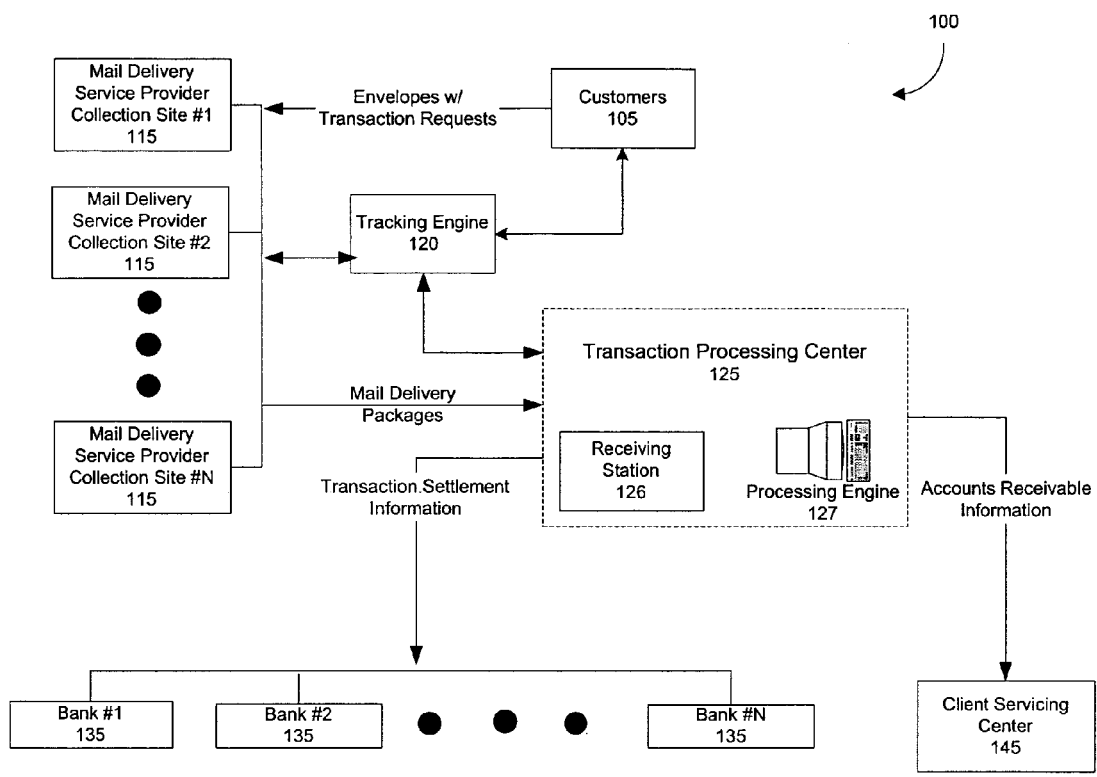
FIG. 1 is a block diagram illustrating the architecture of a system for processing a financial transaction, according to an exemplary embodiment of the present invention.

The present invention is directed to processing a financial transaction. Convenient, efficient, and cost-effective transaction processing can help banks keep their customers happy while simultaneously keeping their balance sheets positive. In accordance with an exemplary embodiment of the present invention, a banking customer, for example, a small business or individual, can visit a local branch of an expedited mail delivery service provider ("service provider"), and drop-off one or more transaction requests, typically financial deposits or payments, for processing. The branch, referred to herein as a "collection site," can collect all the transaction requests that it receives during a predetermined time period into a mail delivery package. The package can be delivered (by the collection site) via expedited mail delivery from the collection site to a transaction processing center. Upon arrival at the transaction processing center, each transaction request can be processed.

By allowing customers to submit their transaction requests at collection sites operated by an expedited mail delivery service provider, banks with few or no branch offices can instantaneously expand their markets, and provide their existing customers with added convenience, at a nominal cost. The service provider typically will comprise a geographically dispersed network of mail collection sites. Rather than bear the expense of opening numerous new branch office locations, banks can utilize the service provider's existing distribution channels to serve their customers in geographically diverse locations.

Also, by collecting each of the requests at the collection site into a single (or minimal number of) package(s), the requests will be less likely to be lost in transit than smaller, stand-alone envelopes. In addition, the total shipping costs for a single package generally will be less than that of the total sum of the shipping costs for each envelope.

The term "expedited mail delivery" is used herein to refer to mail delivery that occurs more rapidly than with regular first class mail. For example, expedited mail delivery can include overnight or express 2-day mail service.

The transaction requests typically comprise both a financial instrument and information about a requested banking transaction. The financial instrument can be a check, including without limitation any paper check, a personal check, and a cashier's check, a money order, or any other instrument used to transfer funds. The information about a requested banking transaction typically includes instructions and information necessary to complete a banking transaction. For example, such information can include a deposit slip or a payment slip to supply information about a requested deposit or payment transaction. The transaction requests typically are contained within an envelope. The term "envelope" is used herein to refer to any type of container that can hold a transaction request. To prevent the collection site personnel from being construed as "participating in a financial transaction" subject to Governmental banking regulations, each envelope generally will be sealed by the banking customer prior to being accepted by the collection site.

In one embodiment, each envelope can comprise a unique identifying insignia. The insignia can be any unique identifier, including for example, a barcode and/or an identification number, where the term "identification number" is used herein to refer to any set of numbers, letters, symbols, or combination thereof. In addition, each package can comprise a second unique identifying insignia. These insignia can be used to track packages and/or envelopes that are in transit from the collection site to the transaction processing center.

Turning now to the drawings, in which like numerals indicate like elements throughout the several figures, an exemplary embodiment of the invention is described in detail.

FIG. 1 illustrates the overall architecture of a system 100 for processing a financial transaction. In a typical application of the system 100, customers 105 drop-off one or more transaction requests at each of a plurality of mail delivery service provider collection sites 115 ("collection sites"). Generally, the collection sites 115 collectively comprise a network of geographically dispersed service centers operating on behalf of the service provider. The service provider can be a private organization (e.g., United Parcel Service—"UPS") or a public organization (e.g., the U.S. Postal Service). Customers 105 that drop-off transaction requests are referred to herein as both "customers" and "requesting customers." Typically, each transaction request is contained within an envelope that bears a unique identifying insignia.

In one application of the system 100, at the end of a predetermined period of time, each collection site 115 gathers together the transaction requests and/or envelopes that it has received. For example, at the end of a business day, each collection site 115 can gather together the transaction requests and/or envelopes that it received during that business day. In addition, each collection site 115 can place the gathered items into a single (or minimal number of) package (s) that bears a second unique identifying insignia. The collection site 115 can send that package via expedited mail delivery to a transaction processing center 125 for processing.

The transaction processing center 125 comprises a receiving station 126 for receiving packages and sorting package contents and a processing engine 127 for processing each received transaction request. Though FIG. 1 illustrates only a single transaction processing center 125, it would be apparent to one skilled in the art that any number of transaction processing centers 125 might be utilized. For example, multiple transaction processing centers 125 can be geographically dispersed, with each transaction processing center 125 being located within a designated geographic region.

In one embodiment, the location of the envelopes and/or packages can be tracked upon deposit with the collection sites 115 by a tracking engine 120. The tracking engine 120 can communicate, for example, with the customers 105, the collection sites 115, and/or the transaction processing center 125 to determine that location. For example, a customer 105 can submit a query to the tracking engine 120, asking it to output the location of an envelope that has a specified unique identifying insignia. The processing steps typically followed by the tracking engine 120 in response to such a query are outlined below, in conjunction with the description of FIG. 5. In one application of the system 100, the tracking engine 120 is accessible to receive, and output responses to, such queries via a terminal and/or an Internet web browser.

Packages containing customers' envelopes and/or transaction requests can be received by the transaction processing center 125, at its receiving station 126. Generally, upon receipt at the receiving station 126, a package is unpacked and its contents are sorted. In an exemplary embodiment, the contents can initially be examined by personnel located at the receiving station 126 to determine whether all of the required information to complete a transaction request has been provided. In addition, the contents typically will be sorted at the receiving station 126, for example by bank name, to aid in the efficient completion of each transaction request. Once the contents are sorted, each transaction request can be processed by the processing engine 127. The processing steps typically followed by the processing engine 127 are outlined in greater detail below, in conjunction with the descriptions of FIGS. 2 and 3.

Through those steps, information regarding the transaction can be sent by the processing engine 127 to a bank 135 and/or a client servicing center 145. The term "client servicing center" is used herein to refer to a store or other entity that is the ultimate beneficiary of a requested banking transaction. For example, a customer 105 can submit for processing a request to pay a store with money from the customer's 105 bank account. The store would be a "client service center." The processing engine 127 could send accounts receivable information to the client service center 145 to inform it of the customer's payment. In addition, the processing engine 127 could send information to the customer's bank 135, for example, to inform the bank 135 that funds should be withdrawn from the customer's 105 bank account.

Figure 2:
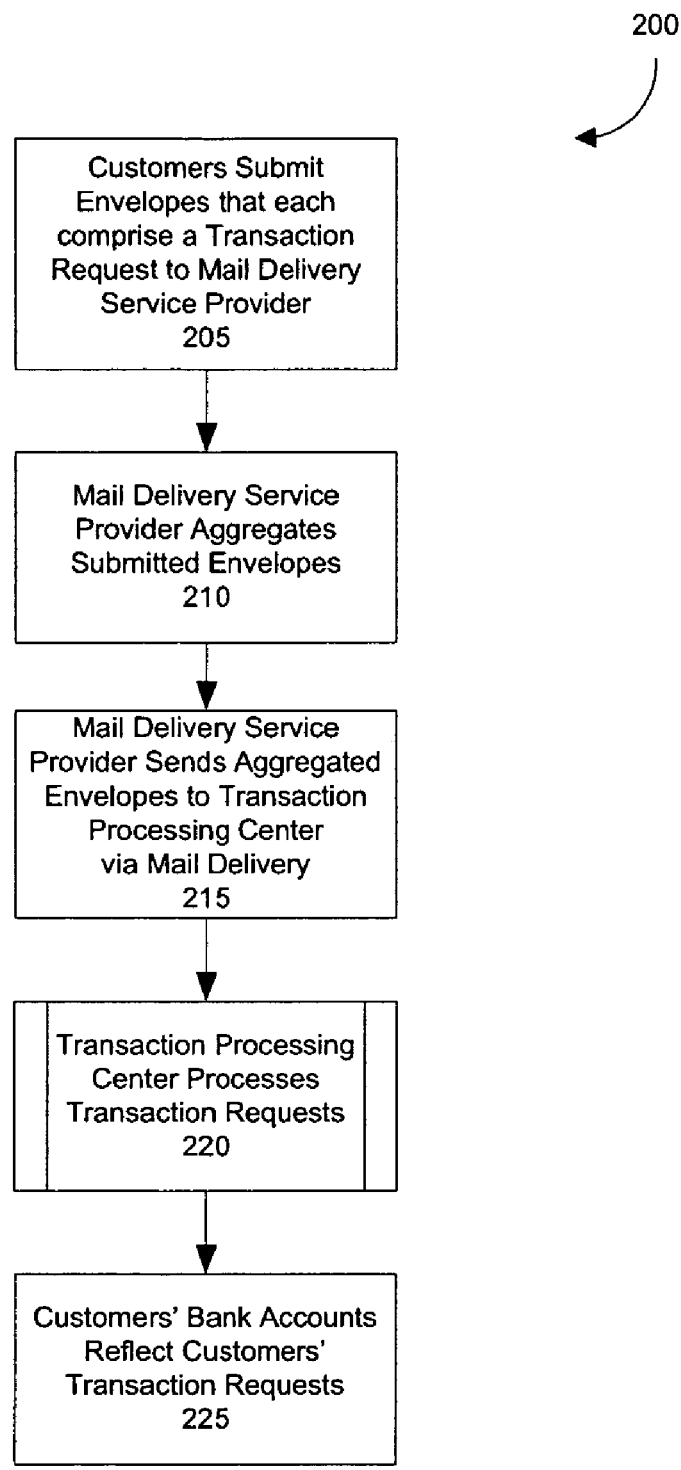
FIG. 2 is a flow chart illustrating steps in a process for processing a financial transaction, according to an exemplary embodiment of the present invention.
Figure 4:
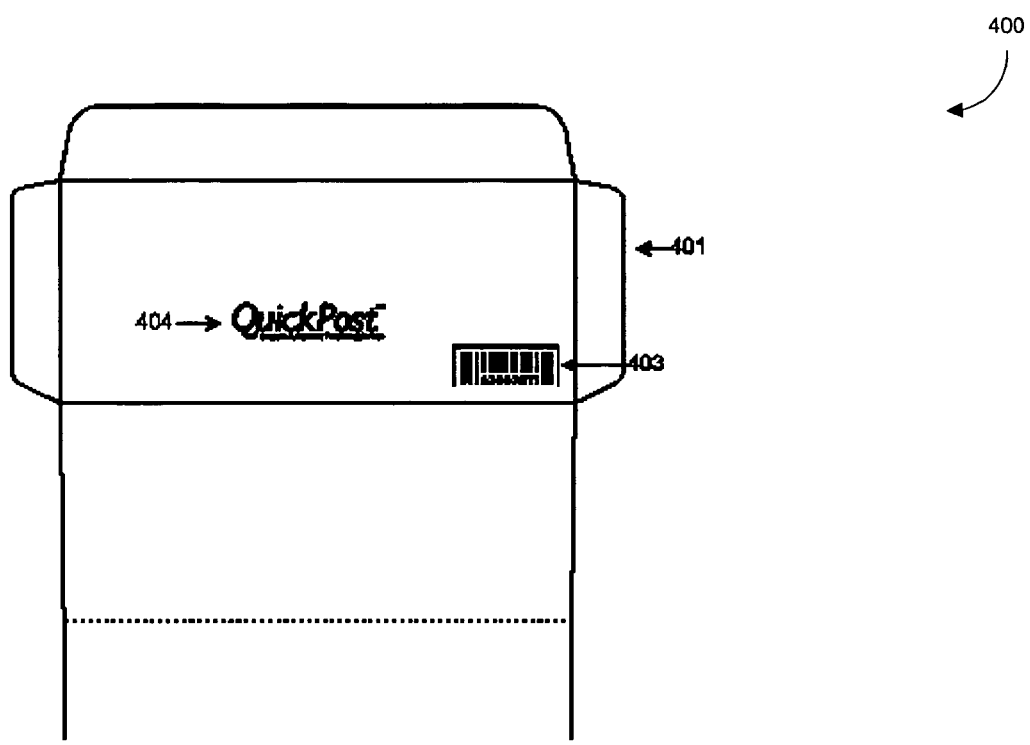
FIG. 4 is a schematic representation of an envelope that could contain a transaction request, according to an exemplary embodiment of the present invention.
Figure 4:
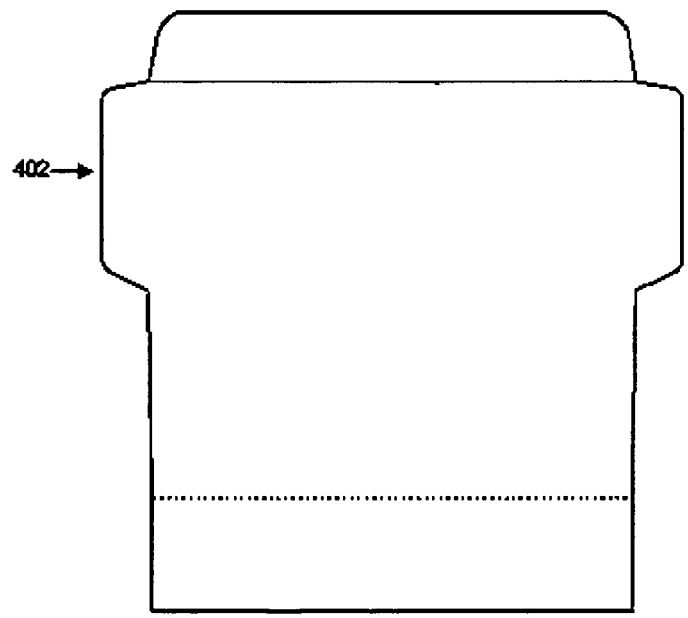

FIG. 2 illustrates steps in a process for processing a financial transaction, according to an exemplary embodiment of the present invention. In alternative embodiments, certain of the steps performed in FIG. 2 can be performed in a different order or not at all. Referring now to FIGS. 1, 2 and 4, in step 205, customers 105 submit envelopes 400 that each comprises a transaction request to a mail delivery service provider at a plurality of collection sites 115. At the end of a predetermined period of time, in step 210, each collection site 115 gathers together the transaction requests and/or envelopes 400 that it has received. For example, at the end of a business day, each collection site 115 can gather together the transaction requests and/or envelopes that it received during that business day. Personnel at each collection site 115 place each transaction request and envelope 400 into a single (or minimal number of) package(s) for expedited mail delivery to the transaction processing center 125.

In step 215, the packages from each collection site are sent to the transaction processing center 125 via expedited mail delivery. Once received at the transaction processing center 125, the transaction requests within each package are processed in step 220. Step 220 can be completed through traditional paper means or through contemporary electronic means, including for example, means that comply with the Check Clearing for the 21$^{st}$ Century Act (Check 21). Step 220 is described, in conjunction with the description of FIG. 3, in more detail below. After each transaction request is processed, in step 225, the customers' bank accounts reflect their transaction requests. For example, if a customer submits a request to credit his account with an additional $100, in step 225, the customer's bank account should reflect this $100 credit.

Figure 3:
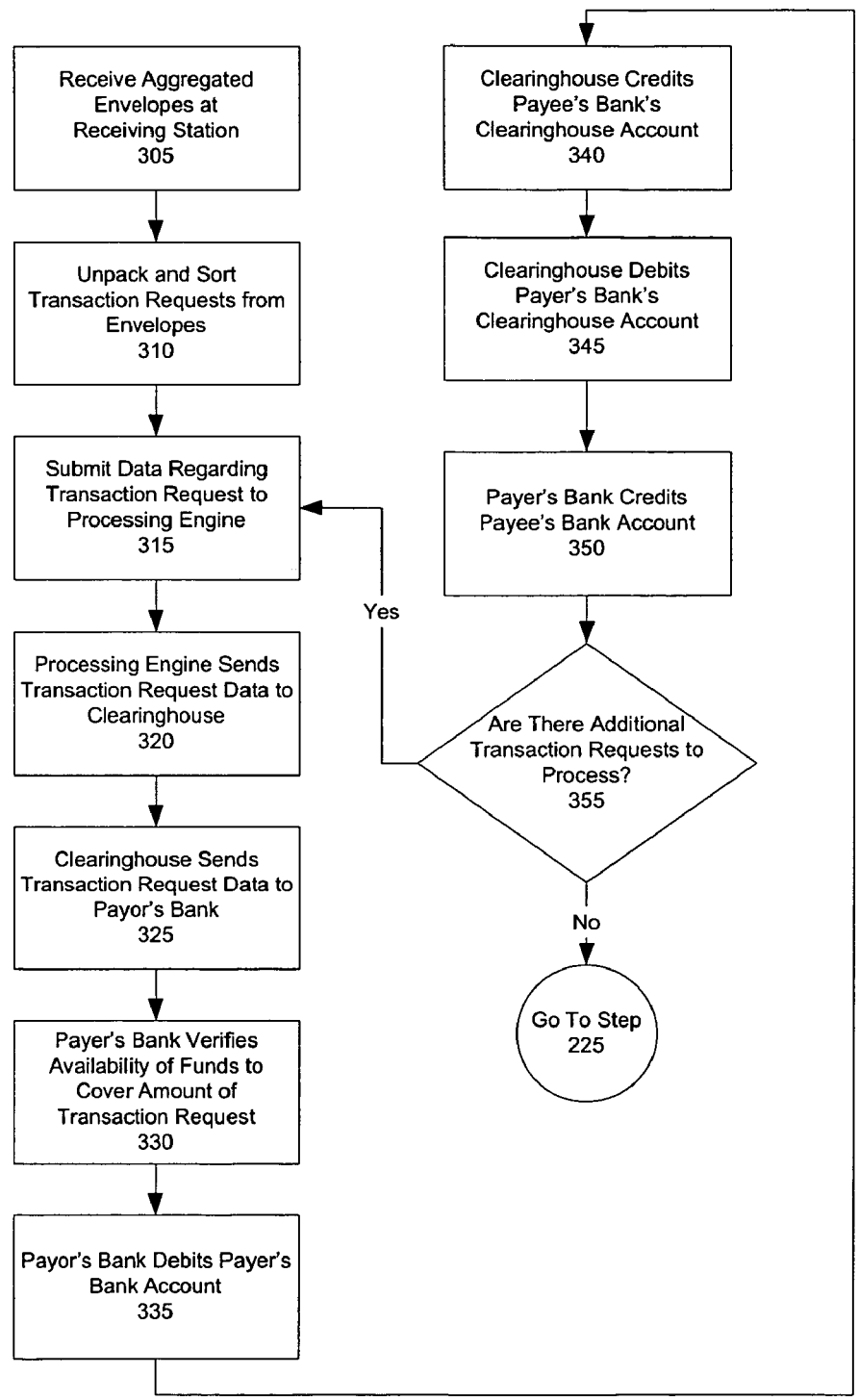
FIG. 3 is a flow chart illustrating steps in a sub-process for processing a transaction request, according to an exemplary embodiment of the present invention.

Next, FIG. 3 illustrates steps in a sub-process for processing a transaction request, according to an exemplary embodiment of the present invention. In alternative embodiments of the present invention, certain of the steps shown in FIG. 3 can be performed in a different order or not at all. Exemplary FIG. 3 depicts step 220 from exemplary FIG. 2 in greater detail.

Referring now to FIGS. 1, 2, 3, and 4, in step 305, the packages comprising aggregated envelopes (and/or transaction requests) are received at the receiving station 126. Next, in step 310, the contents of each package and envelope 400 are unpacked and sorted at the receiving station 126. Through iteration, in accordance with step 355, each unpacked transaction request is processed by the processing engine 127. In step 315, data regarding a transaction request is sent to the processing engine 127. That data can include, for example, information about the requested transaction from e.g., a deposit or payment slip, and/or information about the financial instrument to be processed (e.g., the routing number of the bank on which a check is drawn). In step 320, the processing engine 127 sends that data, or portions thereof, to a clearinghouse for settlement of the transaction.

A clearinghouse is an independent banking organization that settles checks between members. The Federal Reserve Bank is one example of a clearinghouse. Typically, each bank that is a member of a clearinghouse has an account at that clearinghouse that can be credited and debited as funds are deposited in or drawn from the accounts of the bank's customers. In alternative embodiments of the present invention, communication with a clearinghouse can be unnecessary or undesired. For example, if the transaction request does not comprise a check, or if the transaction request involves only members of the same bank 135, the processing engine 127 need not interact with a clearinghouse. Rather, the processing engine 127 can communicate directly with the requesting customer's bank 135. As will be understood by a person of skill in the art, all such communications illustrated in FIG. 3 can be through digital, electronic, telephonic, and/or physical means.

In addition, if a transaction request comprises a paper check, the processing engine 127 can create an electronic image of the check and then send that image to either the clearinghouse or the requesting customer's bank. Alternatively, the processing engine 127 can create and send a substitute check to either the clearinghouse or the requesting customer's bank. A substitute check is a special paper copy of an original check. Substitute checks are specially formatted so they can be processed as if they were original checks. Alternatively, the processing engine 127 can send the original check itself to the clearinghouse or the requesting customer's bank.

In response to step 320, in step 325, the clearinghouse sends the received data, or portions thereof, to the payer's bank. The payer is the person or entity to be debited in the particular transaction, and it can be the requesting customer 105 or a third party. The payer's bank then verifies availability of funds to cover the amount of the transaction request in step 330. In other words, in step 330, the bank from which the funds will be withdrawn verifies that the payer has enough money in his bank account to cover the transaction. Upon such verification, in step 335, the payer's bank debits the payer's bank account by the amount of the transaction and notifies the clearinghouse of the completed transaction.

Next, in step 340, the clearinghouse credit's the payee's bank's clearinghouse account. The payee is the person or entity to be credited in a particular transaction, and it can be the requesting customer 105 or a third party. In step 345, the clearinghouse debits the payer's bank's clearinghouse account, and in step 350, the payer's bank 135 credits the payee's bank account.

Once step 350 has been completed for every received transaction request (in accordance with step 355), the subprocess of step 220 proceeds to step 225 (FIG. 2).

FIG. 4 presents a schematic representation of an envelope 400 that could contain a transaction request to be processed, according to an exemplary embodiment of the present invention. Referring now to FIGS. 1 and 4, the envelope 400 comprises both a front side 401 and a back side 402. The envelope 400 may also comprise a logo 404 or other information identifying the requesting customer's bank 135. The logo 404 could disclose the intended use of the envelope 400 and could also help the receiving station 126 to more efficiently sort received envelopes 400.

Typically, the envelope 400 also comprises a unique identifying insignia 403, which can be used to track the location of the envelope 400 from the time that it is received at a collection site 115. The insignia 403 can be any unique identifier, including for example, a barcode and/or an identification number, where the term "identification number" is used herein to refer to any set of numbers, letters, symbols, or combination thereof. Typically, the insignia 403 is positioned on the front side 401 of the envelope 400, so that it will be immediately accessible upon receipt of an envelope 400. However, as would be appreciated by a person of skill in the art, the unique insignia 403 can be alternatively positioned—it can be placed anywhere on the envelope 400. In addition, the envelope 400 itself can be an alternate shape, structure, and design from that illustrated in FIG. 4.

In one embodiment, a customer 105 can create his own envelope 400. For example, he can print a unique identifying insignia 403 and other information that can be required from his home (or other) computer onto a blank envelope. In another embodiment, computer software and/or instructions can be provided from the service provider to aid the customer 105 in creating such an envelope 400.

Figure 5:
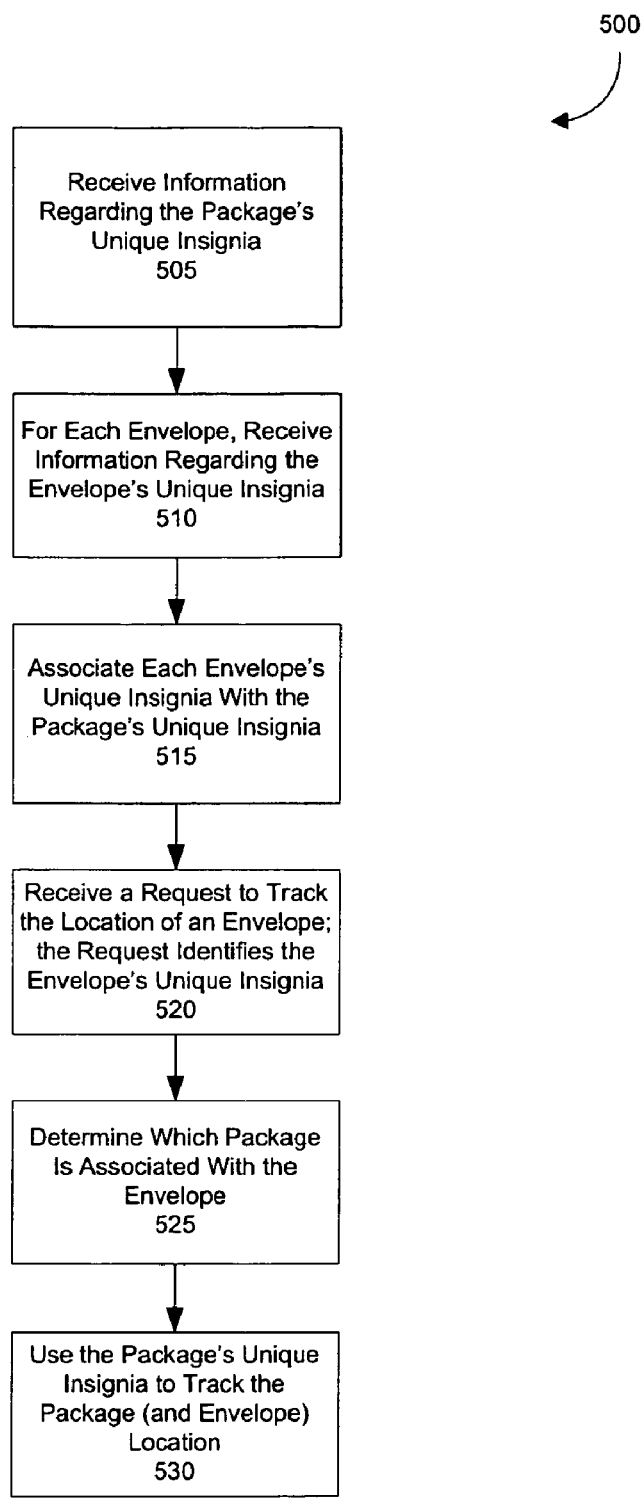
FIG. 5 is a flow chart illustrating steps in a process for tracking the location of an envelope that has been deposited in a system for processing a financial transaction, according to an exemplary embodiment of the present invention.

Next, FIG. 5 illustrates steps in a process for tracking the location of an envelope that has been deposited in the system, according to an exemplary embodiment of the present invention. In alternative embodiments of the present invention, certain of the steps shown in FIG. 5 can be performed in a different order or not at all.

Referring now to FIGS. 1, 2, 4, and 5, as explained above, in conjunction with steps 210 and 215 of FIG. 2, at each collection site 115, one or more envelopes 400 are placed into a single package that can be expeditiously mail-delivered from the collection site 115 to the transaction processing center 125. In one embodiment, each customer 105 that has dropped-off an envelope 400 at a collection site 115 can track the location of their envelope 400 during the expedited mail delivery.

By keeping a record of which envelopes 400 are contained within which packages, the location of each envelope 400 can be tracked simply by tracking the location of the package in which it is contained. In one embodiment, such a record can be created by receiving, and associating together, the unique insignias found on each envelope 400 and on each package. Typically, the collection site 115 will enter the insignias for each received envelope 400 and each shipped package into a record, e.g., by scanning a barcode on each envelope 400 and package. The collection site 115 also will enter into the record the relationships between each envelope 400 and package—it will link the envelopes 400 to the packages in which they are contained. The record may be electronic or otherwise, and can be used by the tracking engine 120 in tracking the location of each envelope 400.

Exemplary steps 505-515 illustrate the creation of such a record. It should be apparent to one of skill in the art that steps 505-515 may be completed either by the collection site 115, as explained above, or by another entity, e.g., the tracking engine 120. For example, the tracking engine 120 can, in step 505, receive information, e.g., from the collection site 115, regarding a package's unique insignia. In step 510, it can then receive information, e.g., from customers 105 and/or the collection site 115, regarding the unique insignias 403 for each envelope 400 (to be or already) contained within that package. Then, in step 515, it can associate each envelope's 400 unique insignia 403 with the unique insignia of the package.

To further illustrate how the envelopes 400 can be associated with the package in which they are contained, assume the following: 1. the package's insignia comprises the text "P1"; 2. the package comprises three envelopes; and 3. the three envelopes' insignias comprise the text "E1," "E2," and "E3" respectively. P1 is linked to each of E1, E2, and E3, for example by creating a record that lists out each of the relationships: E1-P1, E2-P1, E3-P3. To track the location of envelope one, therefore, one need only track the location of the package with the insignia, P1.

In step 520, the tracking engine 120 receives a request to track the location of an envelope 400. The request can be, for example, from the customer 105 that dropped the envelope 400 off at a collection site 115. Typically, the request will be received via an Internet browser interface or telephony system via IVR (interactive voice response). The request generally identifies the envelope's 400 unique identifying insignia 403. In response to the request, in step 525, the tracking engine 120 determines which package is associated with the envelope 400 to be tracked. It can, for example, access a record of package and envelope insignias and relationships, as discussed above. Expanding upon the example from above, if the request identifies an envelope 400 with the unique insignia "E2," the tracking engine 120 will determine that the associated package comprises the unique insignia "P1".

In step 530, the tracking engine 120 uses the package's unique insignia to track the location of the package (and thus, the envelope 400). This step 530 can be completed using means that are well known in the art. For example, the tracking engine 120 can access an existing tracking service provided by the service provider to track the location of the package. The tracking service may be, for example, an Internet-based tracking system that utilizes a web browser interface. One example of such a service that is known in the art is the Internet-based tracking service provided by UPS. Alternatively, it could be a telephony system that uses IVR technology. Other appropriate services and systems will be apparent to persons of skill in the art.

In conclusion, the foregoing exemplary embodiments enable convenient, efficient, and cost-effective processing of a financial transaction. By allowing customers to drop-off their financial transaction requests at any of a plurality of geographically dispersed collection sites, banks with few or no branch offices can instantaneously expand their markets, and provide their existing customers with added convenience, at a nominal cost. Also, by expeditiously mailing from each collection site a package that comprises each of the transaction requests collected during a predetermined time to a transaction processing center via expedited mail delivery, customers' transaction requests will be processed more quickly than under existing approaches. In addition, the bank and/or its customers will save significant shipping costs and it will be less likely that transaction requests will be lost in transit.

It will be appreciated that the exemplary embodiments of the present invention overcome the limitations of the prior art. From the description of the exemplary embodiments, equivalents of the elements shown therein will suggest themselves to those skilled in the art, and ways of constructing other embodiments of the present invention will suggest themselves to practitioners of the art. For example, multiple service providers can be utilized. Furthermore, each of the processing steps discussed above can be computer-implemented or can alternatively be human-implemented. It should be apparent that there could be many different ways of implementing each processing step. The scope of the present invention is to be limited only by the claims below.

We claim:

1. A system for processing a financial transaction, comprising:
   a plurality of non-check processing collection sites operated on behalf of an expedited mail delivery service provider, each site operable to:
     receive at least one transaction request from one or more banking customers, each of the at least one transaction request comprising a financial instrument and information about a requested banking transaction,
     prepare a package comprising each of the at least one transaction request collected during a predetermined time period, and
     mail the package via expedited mail delivery; and
   a transaction processing center operable to:
     receive the package mailed from each of the collection sites, and
     support the completion of the requested banking transaction associated with each of the at least one transaction request by processing each of the at least one transaction request for settlement by one of a clearinghouse and a bank of the respective requesting customer.

2. The system of claim 1, wherein the requested banking transaction is one of a credit to a bank account of the respective requesting customer and a debit from a bank account of the respective requesting customer.

3. The system of claim 1, wherein the collection sites collectively constitute a network of geographically dispersed service centers operating on behalf of the expedited mail delivery service provider.

4. The system of claim 1, wherein the transaction processing center is further operable for electronically processing each transaction request 5. The system of claim 1, wherein each of the at least one transaction request is contained within an envelope comprising a first unique insignia identifying the envelope, and wherein the package comprises a second unique insignia identifying the package.

6. The system of claim 5, wherein the envelope is created by the respective requesting customer.

7. The system of claim 5, wherein each of the first and second unique insignias comprises at least one of a barcode and an identification number.

8. The system of claim 5, further comprising a tracking engine operable to:
   receive information regarding the package's second unique insignia;
   for each envelope, receive information regarding the first unique insignia;
   associate the first unique insignia with the second unique insignia; and
   track a location of each envelope during the expedited mail delivery by using the second unique insignia to track the location of the package.

9. The system of claim 8, wherein the tracking engine is further operable to respond to queries regarding the location of each envelope.

10. A method for processing a financial transaction, comprising the steps of:
    collecting at each of a plurality of non-check processing collection sites at least one transaction request from one or more banking customers, the at least one transaction request comprising a financial instrument and information about a requested banking transaction;
    at each of the collection sites, preparing a package comprising the at least one transaction request collected during a predetermined time period;
    mailing the package comprising the collected at least one transaction request from each of the collection sites to a transaction processing center via expedited mail delivery; and
    responsive to receiving the package from each of the collection sites at the transaction processing center, processing each of the at least one transaction request for settlement by one of a clearinghouse and a bank of the respective customer 11. The method of claim 10, wherein the requested banking transaction is one of a credit to a bank account of the respective requesting customer and a debit from a bank account of the respective requesting customer.

12. The method of claim 10, wherein the step of processing the transaction request for settlement comprises the steps of:
    determining whether the financial instrument comprises a paper check;
    upon a determination that the financial instrument comprises a paper check, creating an electronic image of the check; and
    electronically sending the electronic image of the check to one of the clearinghouse and the bank of the respective requesting customer.

13. The method of claim 10, wherein the step of processing the transaction request for settlement comprises the steps of:
    determining whether the financial instrument comprises a paper check;
    upon a determination that the financial instrument comprises a paper check, creating an electronic image of the check;
    creating a substitute check from the electronic image; and
    sending the substitute check to one of a the clearinghouse and the bank of the respective requesting customer via mail delivery.

14. The method of claim 10, wherein the step of processing the transaction request for settlement comprises the steps of:
determining whether the financial instrument comprises a paper check; and
upon a determination that the financial instrument comprises a paper check, sending the check to one of the clearinghouse and the bank of the respective requesting customer via mail delivery.

15. A method for processing a plurality of financial transactions, comprising the steps of:
collecting at each of a plurality of non-check processing collection sites one or more envelopes from one or more banking customers, each of the one or more envelopes comprising a unique insignia identifying the envelope and a transaction request comprising a financial instrument and information about a requested banking transaction;
at each of the collection sites:
(1) preparing a package with a unique insignia identifying the package, the package comprising each of the one or more envelopes collected at the collection site during a predetermined time period,
(2) associating the unique insignia of each of the one or more envelopes collected at the collection site with the another unique insignia of the package, and
(3) mailing the package from the collection site to a transaction processing center via expedited mail delivery;
repeating steps 1-3 for each of the collection sites, thereby preparing and mailing a plurality of packages;
for each of the packages, tracking the location of each of the one or more envelopes contained within the package during the expedited mail delivery by using the unique insignia of the package to track the location of the package; and
processing each of the transaction requests in response to receiving at the transaction processing center each of the packages from the collection sites.

16. The method of claim 15, wherein the requested banking transaction is one of a credit to a bank account of the respective requesting customer and a debit from a bank account of the respective requesting customer.

17. The method of claim 15, further comprising the step of,
responsive to receiving a query regarding the location of one or more of the one or more envelopes during the expedited mail delivery, providing the location of each of the one or more envelopes.

18. The system of claim 15, wherein at least one of the one or more envelopes is created by the respective requesting customer.

19. The system of claim 15, wherein each of the unique insignias comprises at least one of a barcode and an identification number.

* * * * *